United States Patent Office 3,313,769
Patented Apr. 11, 1967

3,313,769
STABILIZED SYNTHETIC LINEAR POLYCARBON-
AMIDE CONTAINING A COPPER COMPOUND
AND A HALOLACTAM
Paul Maahs, Bad Durkheim, Hans-Georg Matthies and
Fritz Wenger, Ludwigshafen (Rhine), Germany, assignors to Badische Anilin- & Soda-Fabrik Aktiengesellschaft, Ludwigshafen (Rhine), Germany
No Drawing. Filed Aug. 11, 1964, Ser. No. 388,948
Claims priority, application Germany, Sept. 14, 1963,
B 73,521
7 Claims. (Cl. 260—45.75)

This invention relates to polyamides stabilized by adding a mixture of soluble copper compounds and halolactams.

It is known that polyamides may be stabilized against the action of heat and air by the addition of copper or copper compounds, for example copper oxide, copper hydroxide or salts of copper with organic or inorganic acids. Since the best polyamides are obtained when the stabilizing substance is added to the polyamide-forming initial compounds, the use of copper compounds is limited in practice to those which can be dissolved or dispersed well in the initial mixture. Otherwise undesirable agglomerates may form. It is also a disadvantage of the use of copper compounds that some of them, which are soluble in the polyamide-forming initial materials, as for example cupric acetate, when used alone lose their stabilizing action during the continuous polycondensation and processing into threads of filaments.

It is also known that by adding complex-forming compounds for copper compounds, not only is an improvement in solubility or dispersability of the copper compounds in polyamide-forming initial materials, polycondensation mixtures or polyamides achieved, but also the heat stabilizing effect of copper compounds can be increased. Examples of suitable complex-forming compounds which may be used in conjunction with copper compounds are phosphorus compounds, such as phosphates, phosphites or salts of halogen hydracids.

It is a disadvantage that, for example, phosphates affect the degree of polycondensation, while salts of halogen hydracids may cause capillary rupture, for example in the case of polyamide filaments of threads.

It is also known that polyamides may be stabilized by adding a combination of copper compounds, for example copper acetate, and elementary iodine. Such additives strongly attack the reaction vessels.

It is an object of this invention to provide a process for improving the stability of synthetic linear polycarbonamides having recurring intralinear carbonamide groups as an integral part of the main polymer chain against the action of heat and air. Other objects will be apparent from the following description of the subject invention.

The objects of this invention are accomplished by incorporating in a synthetic linear polyamide, a mixture of a soluble copper compound and a halolactam.

The copper compounds are advantageously used in amounts of 0.01 to 0.1%, preferably 0.02 to 0.05%, by weight and the halolactams in amounts of 0.01 to 0.1%, preferably 0.02 to 0.05%, by weight, in each case with reference to the weight of the polyamides.

Polyamides stabilized in this way contain the stabilizers particularly well distributed and in dissolved form.

The polyamides are advantageously stabilized by adding the stabilizers to be used according to this invention to the polyamide-forming initial mixture and carrying out the polycondensation by a conventional method either continuously or batchwise. It is advantageous first to prepare a concentrated solution of copper compound and halolactam in the polyamide-forming initial materials, the concentration of copper compound and halolactam in the polyamide-forming initial materials which serve as a solvent being from about 1 to 10%. These solutions may be stored and transported particularly conveniently. The solutions are added to polyamide-forming initial materials prior to polycondensation. The solution may however be added to the polycondensation mixture during the polycondensation. It is also possible to stabilize the polyamides by mixing the stabilizer mixture consisting of copper compound and halolactam with the polyamides in conventional mixing apparatus.

The polyamide-forming initial materials or the polyamides may be mixed with the usual additives, such as pigments, dyes or light stabilizers, such as soluble manganese salts.

Copper compounds which are soluble in polyamide-forming initial materials are particularly suitable, for example cupric acetate, cupric sulfate or cupric sulfinate. Copper compounds which dissolve with the formation of complexes, for example copper complexes with ammonia, amines or tartaric acid, are also suitable.

Suitable halolactams are lactams having six to fourteen carbon atoms which are halogenated on the nitrogen and/or on carbon, such as caprolactam, capryllactam, oenantholactam or laurolactam which preferably have one or two halogen atoms, such as chlorine, bromine or iodine atoms.

Examples of particularly suitable polyamide-forming initial materials to which the stabilizers to be used according to this invention may be added are lactams having six to twelve carbon atoms, such as caprolactam, capryllactam, oenantholactam or laurolactam; the omega-aminocarboxylic acids on which the lactams are based, such as omega-aminocaproic acid, omega-aminocapryllic acid, omega-amino-oenanthic acid or omega-aminolauric acid; salts of diamines, such as 4,4'-diaminodicyclohexylmethane, hexamethylene diamine, octamethylene diamine or decamethylene diamine and dicarboxylic acids, such as adipic acid, suberic acid, sebacic acid, undecane dicarboxylic acid and heptadecane dicarboxylic acid.

Polycondensation of the polyamide-forming initial materials which contain additives according to this invention may be carried out by conventional methods either continuously or batchwise in the presence of acid or neutral catalysts.

Polyamides stabilized according to this invention are particularly suitable for the production of tyre cord resistant to high temperatures, for the production of silk for industry, for example fishing net yarns, driving belts, conveyer belts, and for the production of moldings by means of injection molding machines. Their particular advantage over polyamides stabilized with prior art stabilizers is the homogeneous distribution of the heat stabilizer in filaments and threads without forming agglomerates so that capillary rupture during stretching processes is avoided. Another advantage is that the stabilizers to be used according to this invention do not corrode the apparatus.

The invention is further illustrated by the following examples in which parts are by weight.

*Example 1*

95 parts of molten caprolactam is mixed in a closed vessel fitted with a stirrer and capable of being heated with 2.5 parts of water, 0.16 part of glacial acetic acid, 0.02 part of cupric acetate and the reaction product of 0.035 part of caprolactam and 0.07 part of iodine dissolved in 5 parts of caprolactam and the mixture is continuously polycondensed in the conventional way. Residual lactam is removed from the polymer by vacuum extraction and the polyamide is formed into filaments in a conventional manner and the filaments are then stretched. The filaments have a relative viscosity (measured in 96% sulfuric acid at 25° C.) of 2.90, an individual titer of 6 denier and a strength of 7.5 g./den. with an elongation at break of 18%. The filaments are left in hot air at 190° C. for one hour and for three hours. The residual strengths, with reference to the value of the untreated sample, are 100% after one hour and 98% after three hours. The filaments are suitable for the production of boil-proof tyre cord.

*Example 2*

100 parts of caprolactam is mixed with 2.5 parts of water, 0.18 part of glacial acetic acid, 0.02 part of cupric acetate and 0.04 part of α-bromocaprolactam are mixed together. The mixture is polymerized and shaped into filaments as described in Example 1. The threads have an individual titer of 8 denier, a relative viscosity of 2.95 and a strength of 7.5 g./den. with an elongation at break of 17%. Strengths (determined as in Example 1) are 102% after one hour and 94% after three hours (with reference to the value of the unheated sample). The filaments are suitable for the production of fishing net yarn.

*Example 3*

100 parts of caprolactam is mixed with 2.5 parts of water, 0.18 part of glacial acetic acid, 0.02 part of cupric acetate and 0.025 part of α-iodocaprolactam and polymerized as described in Example 1. The polyamide is drawn into filaments. The filaments have an individual titer of 8 denier, a relative viscosity of 3.05, a strength of 6.9 g./den. and an elongation at break of 21%. The residual strengths (measured as described in Example 1) are 97% after one hour and after three hours. The filaments are suitable for the production of carpet yarns.

*Example 4*

100 parts of caprolactam is mixed with 2.5 parts of water, 0.18 part of glacial acetic acid, 0.02 part of cupric acetate and 0.018 part of α,α'-dichlorocaprolactam and polymerized as described in Example 1. The polyamide is drawn into filaments. The filaments have an individual titer of 8 denier, a relative viscosity of 3.05, a strength of 7.6 g./den. and an elongation at break of 16%. The residual strengths (determined as described in Example 1) are 100% after one hour and 81% after three hours. The filaments are suitable for the production of tyre cord.

*Example 5*

A mixture of 260 parts of hexamethylene diammonium adipate, 173 parts of water, 1.6 parts of a 70% aqueous solution of butylamine acetate, 0.045 part of cupric acetate and 0.112 part of α-iodocaprolactam is polycondensed in an autoclave in a conventional way (by heating for two hours at 270° C.). The polycondensate has a relative viscosity of 2.03 measured for a 1% solution in 96% sulfuric acid at 25° C. Filaments prepared therefrom in a conventional way have an individual titer of 6.8, a relative viscosity of 2.05, a strength of 4–4.5 g./den. and an elongation at break of 29%.

Residual strengths (determined as in Example 1) are 102% after one hour and 88% after three hours.

*Comparative Example 1*

100 parts of caprolactam is mixed with 2.5 parts of water, 0.16 part of glacial acetic acid, 0.02 part cupric acetate, and polymerized as described in Example 1. The polyamide is made into filaments. The filaments have an individual titer of 6 denier, a relative viscosity of 3.0 a strength of 8 g./den. and an elongation at break of 16%. Residual strengths (determined as described in Example 1) are 60% after one hour and 48% after three hours. The filaments exhibit in a microscopic longitudinal section numerous punctiform and fusiform agglomerates.

*Comparative Example 2*

100 parts of caprolactam is mixed with 2.5 parts of water and 0.16 parts of glacial acetic acid and polymerized as described in Example 1. The polyamide is made into filaments by a conventional method. The filaments have an individual titer of 6 denier, a relative viscosity of 2.95, a strength of 7.7 g./den. and an elongation at break of 17%. Residual strengths (determined as described in Example 1) are 53% after one hour and 38% after three hours.

Strengths according to Examples 1 to 4 and the two comparative Examples are compared in the following table.

TABLE

| Example | Polyamide | Stabilizer | Residual strength after— | |
|---|---|---|---|---|
| | | | 1 hour, percent | 3 hours, percent |
| 1 | Nylon 6 | Cupric acetate plus iodocaprolactam | 100 | 97 |
| 2 | do | Cupric acetate plus α-bromocaprolactam | 102 | 94 |
| 3 | do | Cupric acetate plus α-iodocaprolactam | 97 | 97 |
| 4 | do | Cupric acetate plus α,α'-dichlorocaprolactam | 100 | 81 |
| 5 | Nylon 6,6 | Cupric acetate plus α-bromocaprolactam | 102 | 88 |
| Comparative: | | | | |
| 1 | | Cupric acetate | 60 | 48 |
| 2 | | None | 53 | 38 |

We claim:

1. A composition of matter comprising a synthetic linear polycarbonamide having recurring intralinear carbonamide groups as an integral part of the main polymer chain and a mixture of from 0.01 to 0.1% by weight of a soluble copper salt and from 0.01 to 0.1% by weight of a halolactam containing from 4 to 16 carbon atoms and from 1 to 2 halogen atoms selected from the group consisting of chlorine, bromine and iodine, percentages with reference to said polycarbonamide.

2. A composition of matter comprising a synthetic linear polycarbonamide having recurring intralinear carbonamide groups as an integral part of the main polymer chain and a mixture of from 0.01 to 0.1% by weight of cupric acetate and from 0.01 to 0.1% by weight of a halolactam containing from 4 to 16 carbon atoms and from 1 to 2 halogen atoms selected from the group consisting of chlorine, bromine and iodine, percentages with reference to said polycarbonamide.

3. A composition of matter comprising a synthetic linear polycarbonamide having recurring intralinear carbonamide groups as an integral part of the main polymer chain and a mixture of from 0.02 to 0.05% by weight of cupric acetate compound and from 0.02 to 0.05% by weight of a halolactam containing from 4 to 16 carbon atoms and from 1 to 2 halogen atoms selected from the group consisting of chlorine, bromine and iodine, percentages with reference to said polycarbonamide.

4. A composition of matter as claimed in claim 3 wherein said halolactam is caprolactam having from one to two halogen atoms.

5. A composition of matter as claimed in claim 3 wherein said halolactam is capryllactam having from one to two halogen atoms.

6. A composition of matter as claimed in claim 3 wherein said halolactam is oenantholactam having from one to two halogen atoms.

7. A composition of matter as claimed in claim 3 wherein halolactam is laurolactam having from one to two halogen atoms.

References Cited by the Examiner
UNITED STATES PATENTS 2,817,646  12/1957  Payne _____ 260—78
2,960,489  11/1960  Gabler et al. _____ 260—45.75

LEON J. BERCOVITZ, *Primary Examiner.*

G. W. RAUCHFUSS, *Assistant Examiner.*